United States Patent [19]
Iwasaki

[11] Patent Number: 6,016,329
[45] Date of Patent: Jan. 18, 2000

[54] METHOD AND APPARATUS FOR PREAMBLE-LESS DEMODULATION

[75] Inventor: Motoya Iwasaki, Tokyo, Japan

[73] Assignee: NEC Corporation, Tokyo, Japan

[21] Appl. No.: 08/919,820

[22] Filed: Aug. 29, 1997

[30] Foreign Application Priority Data

Sep. 27, 1996 [JP] Japan .................................. 8-255978

[51] Int. Cl.[7] .............................. H03D 1/00; H04L 27/10; H04J 3/12
[52] U.S. Cl. .......................... 375/340; 375/283; 370/523
[58] Field of Search .................................. 375/340, 283, 375/329, 279, 330, 326, 327, 343, 365, 369, 366, 364; 329/300, 307; 370/523

[56] References Cited

U.S. PATENT DOCUMENTS

| | | | |
|---|---|---|---|
| 4,947,409 | 8/1990 | Raith et al. ............................... | 375/344 |
| 5,093,846 | 3/1992 | Walton, Jr. et al. ..................... | 375/343 |
| 5,276,710 | 1/1994 | Iwasaki et al. .......................... | 375/340 |
| 5,333,148 | 7/1994 | Tsubaki et al. .......................... | 375/229 |

FOREIGN PATENT DOCUMENTS

| | | |
|---|---|---|
| 5-63743 | 3/1991 | Japan . |
| 5-167630 | 7/1993 | Japan . |

*Primary Examiner*—Ricky Ngo
*Assistant Examiner*—Khai Tran
*Attorney, Agent, or Firm*—McGinn & gibb, P.C.

[57] ABSTRACT

A method and apparatus for demodulating includes differential-detecting an input signal into which a unique word is inserted, correlating an output of the differential-detection and a data table obtained by differential-detecting the unique word, detecting a time when an electric power of a correlation output which exceeds a threshold value becomes the local maximum, reading the input signal stored in a buffer from the leading end of the unique word, estimating a frequency error of the input signal based on a phase of the correlation output, obtaining a signal by removing the frequency error from the read signal and inverse-modulating a unique word portion in the signal in which the frequency error has been removed, according to a data of a unique word table, and then reproducing a carrier signal.

32 Claims, 5 Drawing Sheets

METHOD AND APPARATUS FOR PREAMBLE-LESS DEMODULATION

BACKGROUND OF THE INVENTION

1. Field of the Invention

The present invention generally relates to a method and apparatus for preamble-less demodulation, and more particularly relates to a carrier recovery system and method and a clock recovery system and method for demodulating a signal (into which a unique word has been inserted), thereby demodulating a signal subjected to phase-shift keying (PSK) or frequency-shift keying (FSK).

2. Description of the Related Art

A conventional technique for demodulating a received signal (into which a unique word has been inserted) includes synchronizing a frame and sensing the unique word to demodulate the signal. The unique word is a fixed pattern which is known by the receiver side, and it is used typically for frame synchronization. For example, "a unique word sensor" described in Japanese Patent Application Laid-Open (Kokai) No. 5-167630 provides a circuit for sensing a unique word by a relatively small circuit, even if the input signal has a frequency error.

As shown in FIG. 9, a signal having a frame into which a unique word (e.g., a fixed word) is periodically inserted is referred to as an input signal R(t). This input signal R(t) is first delay-detected (e.g., differential-detected). Differential-detection is a known modulation scheme. In this case, differential-detection is utilized to find the unique word in the input signal. The differential-detection is conducted by a first delay-detector (e.g., differential-detector) 25, thereby obtaining a detected output D(t). Differential-detection is conducted using the equation of:

$$D(t) = R(t)R^*(t-\tau)$$

Next, a unique word pattern U(t) from a unique word generator 21 is differential-detected by a second differential-detector 26, thereby obtaining a pattern W(t). The cross-correlation between the detected output D(t) and the pattern W(t) is calculated by a cross-correlator 22. Briefly, such a cross-correlator 22 operates by comparing the pattern with known patterns, and utilizing, for example, the equation as follows:

$$C(t) = \int W^*(\tau) D(t+\tau) d\tau$$

The power converter 24 takes the square of the absolute value and uses the following equation:

$$P(t) = |C(t)|^2$$

Electric power converter 24 issues a signal representing power (e.g., watts) to a level sensor 23. Level sensor 23 detects whether the absolute value of the calculated cross-correlation exceeds a threshold value, thereby sensing the unique word. The input signal is differential-detected by the above-mentioned structure, which is capable of removing a frequency offset included in the input signal. The frequency offset is generated by the frequency difference between a transmitter frequency fT(e.g., the transmitter side) and a receive frequency fR(e.g., the receiver side). If the frequency offset is not removed, the correlator c(t) cannot detect the unique word since correlation relies on the equation of Δf and if Δf is large, the patterns cannot be correlated, and the unique word cannot be found. Such an operation relies on the following equations: The relation between an orthogonal modulation data (I, Q) and an orthogonal demodulation data (I', Q') is $$I' + jQ' = (I + jQ)e^{j2\pi(fT-fR)t}$$

$$\Delta f = fT - fR$$

$$c(t) = \int U^*(t)U(t+\tau)e^{j2\pi\Delta f(t+\tau)}d\tau$$

$$c(o) = \int U^*(\tau)U(\tau)e^{j2\pi\Delta f\tau}dt = \int e^{j2\pi\Delta f\tau}d\tau$$

$$\sim \sim$$

$$\Downarrow$$

$$1$$

Further, FIG. 10 illustrates a conventional technique for a carrier recovery circuit. A signal Rs is output from a fixed word table 32 through a switch unit 34. The fixed word (e.g., a unique word) portion in the input signal (Ri) is inverse-modulated with the signal Rs by inverse-modulator 36 (e.g., inverse-modulators 36 and 38 may be complex multipliers or the like for removing the modulation component from the received signal) and is complex-conjugated (e.g., converting the input complex signal to its conjugate value (a+jb→a−jb) by a multiplier (e.g., within de-modulator 36). An output signal of the inverse-modulation w(t) is determined by the following equation:

$$w(t) = (I' + jQ')(I - jQ)$$
$$= (I + jQ)(I - jQ)e^{j2\pi\Delta ft}$$
$$= (I^2 + Q^2)e^{j2\pi\Delta ft}$$

$$\sim \sim$$

$$\downarrow$$

constant

Δf is the frequency offset. The inverse-modulator 36 removes a modulated component (Rd) from the signal Rs, and outputs the modulated component Rd to an adaptive line enhancer 31.

The adaptive line enhancer 31 is tuned to a line component of the above inverse-modulated signal Rd, and extracts a carrier wave component, thereby obtaining a demodulated output Ro of the input signal. For purposes of this application, a line component is expressed as:

$$e^{j2\pi\Delta ft}$$

With such a conventional structure, when data appears after the unique word portion of the input signal, the changing switch 34 is switched to a hard decision circuit 33. The data portion of the signal is detected since the relationship between the unique word and the data timing is always the same (e.g., constant). Thus, the data timing can be estimated from the unique word position. The hard decision circuit 33 estimates an integer Rh (fixed word) based on the demodulated signal Ro. This estimation is made by examining which quadrant the demodulation signal is (e.g., −1+j; 1+j; 1−j; or −1−j, where j is an imaginary value)).

The input signal Ri is inverse-modulated by the estimated value Rh (e.g., with element 36), thereby removing the modulated component from the input signal Ri. The details of the above-mentioned operation are described in Japanese Patent Application Laid Open (Kokai) No. 5-63743.

Therefore, in a conventional demodulating device, the position of the unique word in the input signal is sensed according to the above-mentioned technique of Japanese Patent Application Laid Open (Kokai) No. 5-167630 (e.g., FIG. 9). Then, based on the technique of Japanese Patent Application Laid Open (Kokai) No. 5-63743, the unique word portion is inverse-modulated according to a unique word table. The other portion (e.g., the data portion) is inverse-modulated by an output of the demodulator, thereby executing the modulating process.

In other words, the changing switch 34 shown in FIG. 10 is driven by an output of the level sensor 23 shown in FIG. 9, thereby selecting whether the inverse-modulation should be based on the unique word table 32 (e.g., $R_u$) or the modulated output signal Ro (and $R_H$ from hard decision circuit 33).

According to the technique of Japanese Patent Application Laid Open (Kokai) No. 5-167630, the unique word detection pulse is output when the output of the correlator 22 exceeds the threshold value (e.g., when the clock phase of the input signal cannot be estimated with a high accuracy). In such a situation, the subsequent characteristic (such as timing) of the demodulator deteriorates. More specifically, the accuracy with which the clock phase is estimated (depending on how the threshold value is determined), falls within a range of about ±½ clock (e.g., one-half of a given clock cycle). This deviation is large enough to impact significantly the performance of a given device.

The structure illustrated in FIG. 10 (e.g., Japanese Patent Application Laid Open (Kokai) No. 5-63743) has an "acquisition" or "pull in" frequency range (in which the acquisition is realized at a high probability of, for example, over 95%) is only about ±⅛ of a symbol frequency. The "acquisition frequency" (also known as the "pull-in frequency" or "lock-in frequency") is related to the symbol frequency based on the acquisition probabilities along a graph (e.g., a Y-axis) and the frequency error offset along the X-axis, where the frequent error offset is from 0 to fs/4 where fs is equal to the symbol frequency.

A problem arises with the structure shown in FIG. 10 because an input signal which has an input frequency offset that exceeds the above range (e.g., ⅛) cannot be demodulated.

SUMMARY OF THE INVENTION

In view of the foregoing and other problems of the conventional systems and methods, it is an object of the present invention to provide a structure and method for preamble-less demodulation which utilizes a unique word included in an input signal. The present invention estimates the clock phase with higher accuracy to prevent the subsequent acquisition (e.g., or "pull in") characteristic of the demodulator from deteriorating, and to provide a demodulating device which estimates a frequency offset, thereby increasing the acquisition frequency range.

In a first aspect, the present invention includes a method and apparatus for differential-detecting an input signal into which a unique word is inserted, correlating an output of the differential-detection and data in a data table obtained by differential-detecting the unique word, detecting a time when an electrical power of a correlation output which exceeds a threshold value becomes the local maximum, reading the input signal stored in a buffer from the leading end of the unique word, estimating a frequency error of the input signal based on a phase of the correlation output, obtaining a signal by removing the frequency error from the read signal, inverse-modulating a unique word portion in the signal in which the frequency error has been removed, according to a data of a unique word table, and then reproducing a carrier wave.

Further, to reproduce the carrier wave, the invention includes a changing switch for selecting an output of the first inverse-modulator for the unique word portion and selecting an output of a second inverse-modulator for a portion other than the unique word portion, an adaptive line enhancer for receiving an output of the changing switch to extract a carrier wave corresponding to the line component, a complex-conjugating device for transforming an output of the adaptive line enhancer to a complex conjugation value (e.g., complex conjugate), and a multiplier for multiplying an output of the complex-conjugating device by the output of the first inverse-modulator to output the demodulated signal.

Further, with the invention, the output peak of the correlator is monitored (after the threshold has been exceeded), thereby allowing the clock phase to be estimated with very high accuracy.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
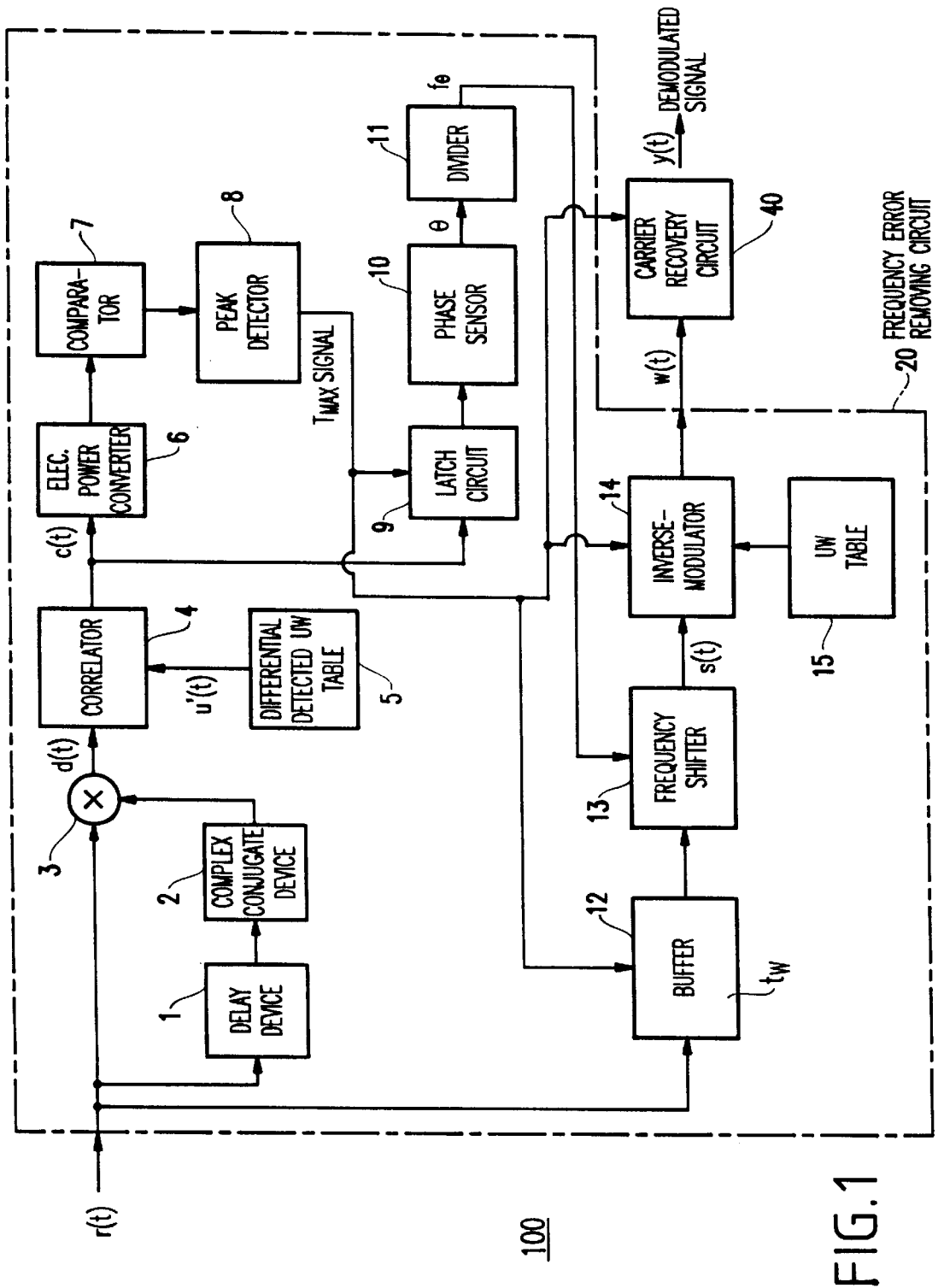
FIG. 1 is a schematic block diagram showing a demodulator 100 according to the present invention.

Referring now to the drawings, and more particularly to FIG. 1, a schematic block diagram showing a demodulating device 100 according to an embodiment of the present invention is illustrated.

However, prior to examining the structure of the preferred embodiment, the principles of the present invention are described hereinbelow.

When a fixed word portion is represented by U(t), and the frequency error is represented by fd, the fixed word portion included in the input signal r(t) is represented by using the following equation (1).

$$r(t) = U(t)e^{j2\pi fdt} \quad (t_0 \leq t < t_o + t_u) \qquad \text{Equation (1)}$$

This fixed word portion represented by the use of the equation (1) is differential-detected with respect to the time τ, according to the following equation (2). It is noted that elements 1–3 of FIG. 1 are used for differential detection. Further, it is noted that the unique word is transmitted only during the period noted above (e.g., after the above equation).

$$d(t) = U(t)U^*(t-\tau)e^{-j2\pi fdt} \qquad \text{Equation (2)}$$

Equation 3 represents the reference function for the cross-correlator.

$$W(t) = U(t)U^*(t-\tau) \qquad \text{Equation (3)}$$

The signal represented by equation (2) and the signal represented by equation (3) are cross-correlated, so that the correlated value C(t) obtained when the correlation is detected is represented by the following equation (4).

$$C(t_0) = Ae^{-j2\pi fdt} \qquad \text{Equation (4)}$$

In equation 4, A designates a real number and the phase is $2\pi fd\tau$, which is capable of estimating a fd value, because τ is known. Equation 4 is determined for time $t_0$, whereas fdt is at a time of peak. It is noted that the general function of the above Equation 4 is as set forth below:

$$C(t) = \int W_t^{t+tu*}(x)d(t+x))dx$$

By using the value (e.g., frequency error offset) estimated by the above equations, the frequency error of the input signal is removed, even if the frequency error of the input signal exceeds a acquisition range. In contrast, as discussed above, the signal cannot be demodulated by the conventional structure disclosed in Japanese Patent Application Laid Open (Kokai) No. 5-63743 if the frequency error of the input signal exceeds a specified acquisition range (e.g., "pull-in" or "lock-in" range) (e.g., ⅛ of a clock cycle).

Turning now to FIG. 1 and a detailed examination of the inventive structure and method, the demodulating device 100 according to the present invention includes a frequency error removing circuit 20 and a carrier recovery circuit 40.

In the frequency error removing circuit 20, an input signal r(t) has a unique word at a beginning thereof and a data signal portion at an end portion thereof, and is in a frame form. For purposes of this application, "frame form" is defined as a frame format in which the unique word is at the beginning of the frame and the data portion is at the end portion of the frame. However, the input signal r(t) has no need of a preamble and therefore does not have a preamble, unlike in the conventional demodulating device. A preamble is not provided in the invention since the preamble requires a longer "un-useful" signal (e.g., the preamble takes up space/bits which could be used for data or other useful portions of the frame). If a preamble is not included in the conventional device, loss of data, or data unrecognizability may result, thereby resulting in the signal not being able to be demodulated. Hence, the conventional device requires a preamble, thereby resulting in decreased efficiency of the channel.

The input signal r(t) is first delayed by a time period tc by a delay device 1 and is complex-conjugated by a complex-conjugating device 2. The delay time of the delay device 1 is tc.

Then, this signal (e.g., the complex-conjugated input signal) is complex-multiplied with the undelayed input signal (e.g., not passed through the delay device 1) by a complex multiplier 3 to thereby obtain an output d(t). Output d(t) is the differential detection signal.

The d(t) signal and a differential-detected unique word pattern, which is stored in a differential-detected unique word table 5, are cross-correlated, by the correlator 4. It is noted that the unique word table is created by calculating the differential detection of the unique word. An output c(t) of the correlator 4 is first converted into a power signal (e.g., if $c(t) = C_x + jC_y$, power $= C_x^2 + C_y^2$) by an electrical power converter 6. Output c(t) represents a correlated value.

A comparator 7 detects whether the power exceeds the threshold value (e.g., excess voltage). The threshold value may be freely set depending on the designer's constraints and requirements.

A peak detector 8 detects when (e.g., the time TMAX) the power has become a maximum based on an output from the comparator 7. The time TMAX has an accuracy of about ±1 clock.

The output of the correlator 4 is latched by a latching circuit 9 when the voltage signal reaches the peak voltage (e.g., the time TMAX). The latched output is converted into a phase θ by a phase detector 10, and is further divided by a time tc (e.g., same as the time delay τ and represents the delay time of the delay device)) by a divider 11, which obtains the estimated frequency error fe.

For example, referring to Equation 4, here the latch signal is $Ae^{-2\pi fdt}$, where Tc is 1 symbol, θ=2π/10, and fe=1/10 symbol rate. Here, fd=fe, τ=$t_0$, so θ=2πfdτ=2πfeTc. Therefore, fe=θ/2πTc.

The input signal r(t) is also stored in a buffer 12. The stored signal is read out in order from the leading end portion of the unique word according to the output of the peak detector 8. Then, the estimated frequency error fe is removed from the stored signal by a frequency shifter 13 by using the estimated frequency error fe output from the divider 11. It is noted that the frequency error fe is an approximation, and thus is an "estimated" frequency error. The larger the delay (e.g., as described below in the second embodiment having a plurality of delay devices), the more accurate the estimated frequency error fe. The inverse-modulator 14 removes the demodulated component from this signal by using a unique word value from a unique word table 15. The values in table 15 can be used to obtain values in differential-detected UW table 5.

The demodulation operation is described in greater detail below. The inverse-modulator 14 only operates when the output of the peak detector 8 indicates the presence of the unique word. Therefore, inverse-modulator 14 allows the stored signal (less the estimated frequency error fe) to pass, unless peak detector 8 indicates that the time is TMAX. During TMAX (e.g., when the unique word is present) the inverse-modulator 14 demodulates the signal. The signal output by the inverse-modulator 14 is input to the carrier recovery circuit 40.

Figure 2A:
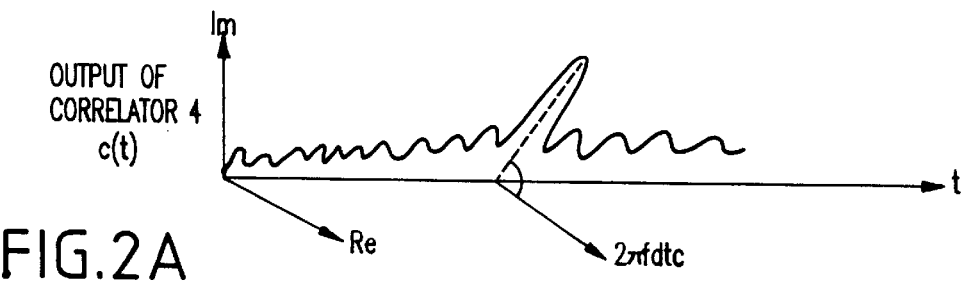
FIG. 2(a) is a graph illustrating waveforms output by the correlator of the present invention.

The operation of the frequency error removing circuit 20 according to the embodiment of the present invention will be described in detail hereinafter with reference to FIGS. 2(a) and 2(b).

The following input signal r(t) has a unique word u(t) (which is a predetermined fixed pattern (e.g., signal waveform) and a frequency error fd, and then represented by a complex number as below. The complex number includes two series of signals which are orthogonally detected asynchronously, and is represented by the following equation.

$$r(t) = \begin{cases} u(t-t_0)e^{j2\pi fdt} & (t_0 \leq t < t_0 + t_u) \\ P(t)e^{j2\pi fdt} & (\text{t: except the above}) \end{cases} \quad \text{Equation (5)}$$

It is noted that {in the above equation means that when ($t_0 \leq t < t_0 + t_u$) holds, the upper term is used. Otherwise, the lower term is used. In the above equation 5, j is an imaginary number, fd is the frequency offset, and t is the time.

Further, in the above Equation (5), $t_0$ designates the time of a leading end (edge) of the unique word, $t_u$ is the length of the unique word, and P(t) represents the random data that follows the unique word portion.

When the r(t) signal is input to the differential detecting circuit (including the delay device 1, the complex-conjugating device 2 and the multiplier 3 shown in FIG. 1), the output d(t) is represented, within the period ($t_0 \leq t < t_0 + t_u$) the unique word, by the following equation 6.

$$d(t) = u(t-t_0)u^*(t-t_0-t_c)e^{j2\pi fd(tc)} = u'(t-t_0)e^{j2\pi fd(tc)}$$
$$(t_0 \leq t \leq t_0 + t_u) \quad \text{Equation (6)}$$

In equation (6), * designates a complex conjugate.
Here, $$u'(t) = u(t)u^*(t-t_c) \quad \text{Equation (7)}$$

u'(t) is a differential detected unique word. The correlator 4 outputs a correlated value c(t) between the d(t) and a waveform u'(t) obtained by delay-detecting the unique word pattern. The following output c(t) of the correlator 4 is shown in FIG. 2(a).

Equations (8) and (9) represent (outputs c(t)). By substituting Equation (6) to Equation (8), Equation (9) is obtained, and are shown below.

$$c(t) = \int_0^{t_u} d(t - t_u + x)u'^*(x)e^{j2\pi fdtc} dx \quad \text{Equation (8)}$$

$$= \int_0^{t_u} u'(t - (t_0 + t_u) + x)u'^*(x)e^{j2\pi fdtc} dx \quad \text{Equation (9)}$$

$$(t_0 \leq t \leq t_0 + t_u)$$

The correlation of (d(t) and the waveform u'(t) coincides perfectly when $t = t_0 + t_u$, that is, at the end of the unique word. The electric power $|c(t)|^2$ of the waveform c(t) obtained by electrical power converter 6 becomes the maximum power (peak) indicating the presence/end of the unique word, when $t = t_0 + t_u$. The output $|c(t)|^2$ of the electric power converter 6 is shown in FIG. 2(b).

Figure 2B:
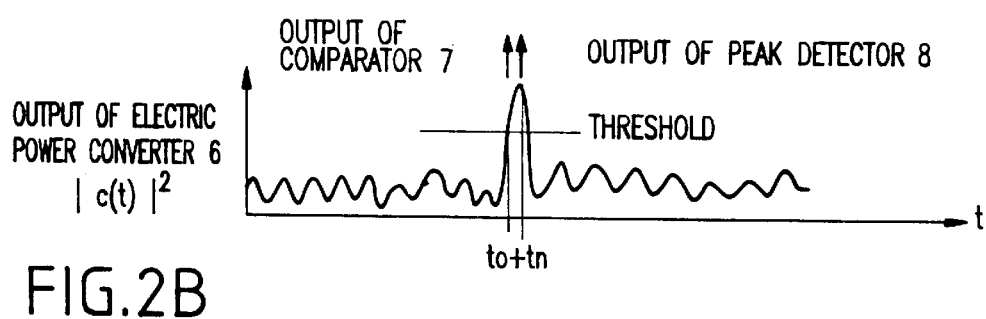
FIG. 2(b) is a graph illustrating waveforms output by the electrical power converter, comparator and peak sensor of the present invention.

After the comparator 7 detects that the output of the electric power converter 6 exceeds the threshold value, the peak detector 8 outputs a TMAX signal indicating when the threshold value was exceeded (within ±1 clock), as shown in FIG. 2(b), when $t = t_0 + t_u$.

Therefore, the following c(t) value is obtained when $t = t_0 + t_u$ and is latched by the latching circuit 9 as shown by the following equations (10) and (11).

$$c(t_0 + t_u) = \int_0^{t_u} u'(x)u'^*(x)e^{j2\pi fdtc} x \quad \text{Equation (10)}$$

$$= Ae^{j2\pi fdtc} \quad \text{Equation (11)}$$

This value is converted to the phase θ (θ=2 π fd tc) by the phase sensor 10, and then the phase θ is divided by 2 π tc (e.g., tc represents the delay time constant based on the number of delay elements, in order to obtain the estimated frequency offset) by the divider 11, thereby obtaining the estimated frequency error fe, as shown by the following equation (12).

$$fe = \theta/2\pi t_c \approx \frac{2\pi fd t_c}{2\pi t_c} = fd \quad \text{Equation (12)}$$

The relationship of fe=fd is an approximate expression as shown in the above equation (12) because the phase θ does not perfectly coincide with 2πfdtc due to the influence of noise, etc. Thus, the output of the divider 11 is represented by fe.

The input signal is also stored in order (e.g., sequentially in the order received) in the buffer 12. The stored signal is read out from the leading end of the unique word. The peak detector 8 detects the time $t_0 + t_u$ (indicating the end of the unique word). Thus, the signal is read out (in order) from the time $t_0$.

When the frequency shifter 13 shifts the frequency (using the estimated frequency error value fe of the output of the divider 11), the output S(t) is represented by using the following equation (13).

$$S(t + t_b) = d(t)e^{-j2\pi fet} \quad \text{Equation (13)}$$

$$= \begin{cases} u(t-t_0)e^{j2\pi \Delta ft} & (t_0 \leq t \leq t_0 + t_u) \\ P(t)e^{j2\pi \Delta ft} & (\text{t: except the above}) \end{cases}$$

In Equation 13, Δf=fd−fe, (which is the residual frequency error) and tb is the delay time due to the data buffering by buffer 12). The variable S(t) is inverse-modulated by the inverse-modulator 14 (using the contents u(t) of the unique word table 15). The output of inverse-modulator 14 is represented by the following equations (14) and (15):

$$w(t + t_0) = \begin{cases} S(t+t_b)u^*(t-t_0) & (t_0 \leq t \leq t_0 + t_u) \\ S(t+t_b) & (\text{t: except the above}) \end{cases} \quad \text{Equation (14)}$$

$$= \begin{cases} e^{j2\pi \Delta ft} & (t_0 \leq t \leq t_0 - t_u) \\ P(t)e^{j2\pi \Delta ft} & (\text{t: except the above}) \end{cases} \quad \text{Equation (15)}$$

Equations 14 and 15 produce a signal in which the unique word portion is an unmodulated signal (e.g., a signal not having been modulated), and the frequency error is compressed into Δf. Accordingly, this signal can be easily demodulated by the recovery circuit 40. Specifically, the unmodulated signal is more easily demodulated than conventional signals, and frequency error is reduced. In the conventional system, there is no detection of TMAX so there is a large timing error. Thus, as compared to the present invention (which detects TMAX), the frequency error is high in the conventional systems.

Figure 9:
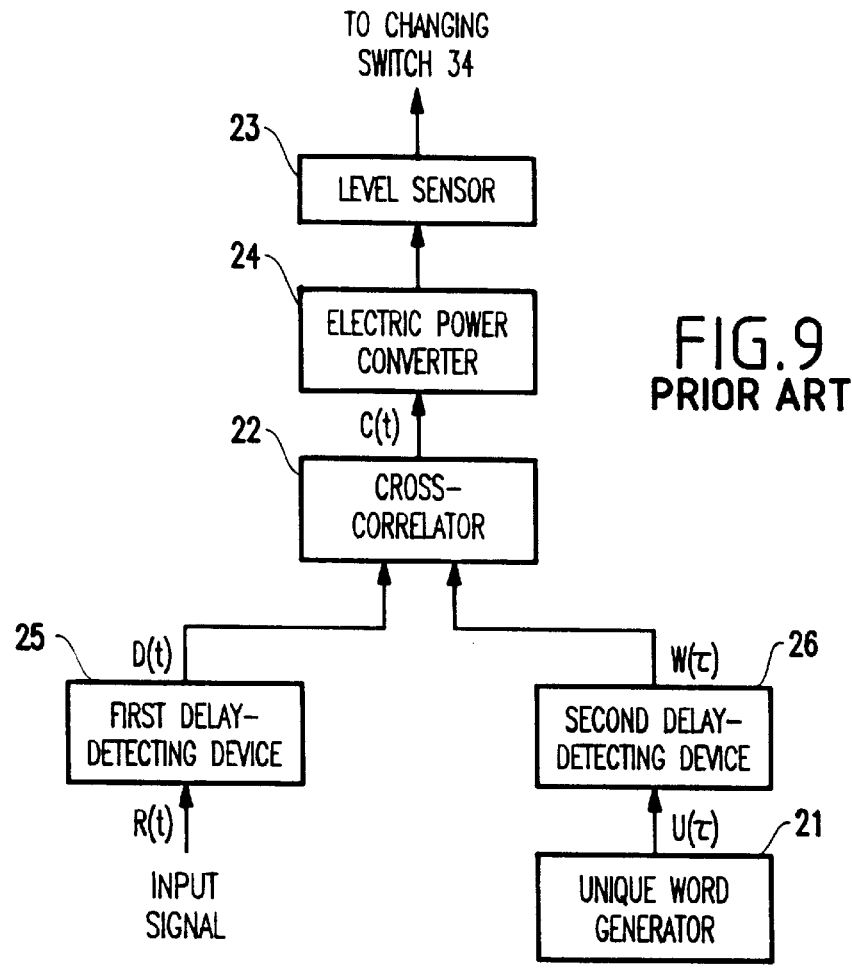
FIG. 9 is a schematic block diagram of a conventional unique word sensor.
Figure 10:
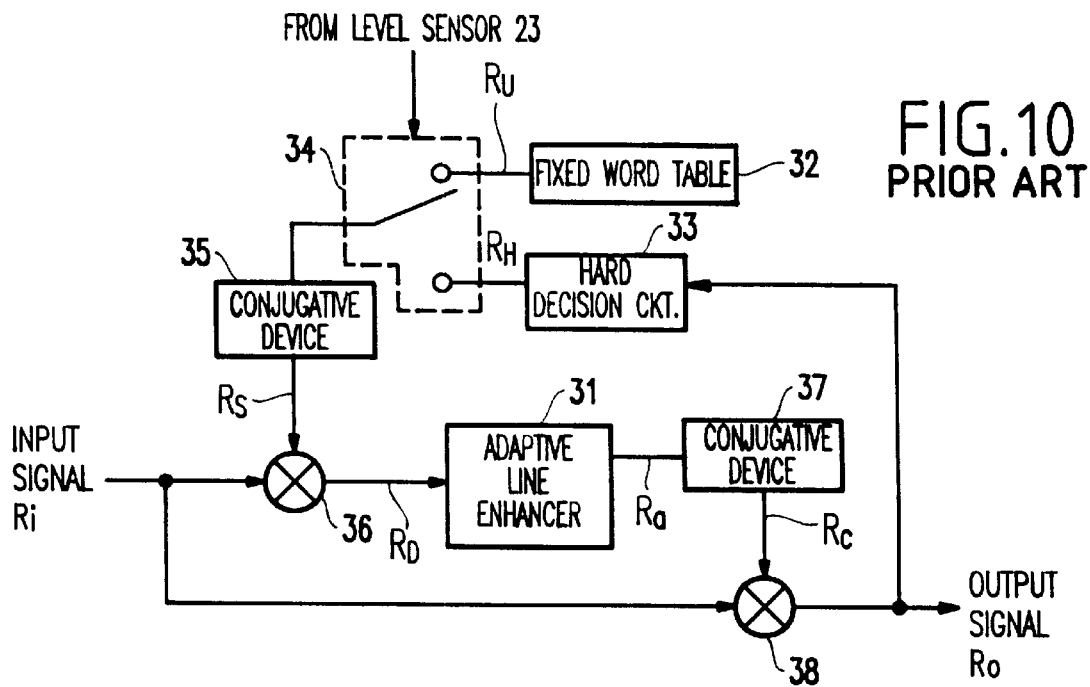
FIG. 10 is a schematic block diagram of a conventional carrier recovery circuit.

In contrast to the unique and unobvious structure shown in FIG. 1, the conventional systems in FIGS. 9 and 10 do not include a peak detector 8 or include elements 9–15 and 40. Thus, the system of FIG. 9 does not detect the clock timing accurately and it does not (and cannot) estimate the frequency error. Further, the system of FIG. 10 does not have any frequency error estimation means. Thus, the conventional systems cannot achieve the unexpectedly superior results of the structure and method of the present invention as shown in FIG. 1.

Figure 3:
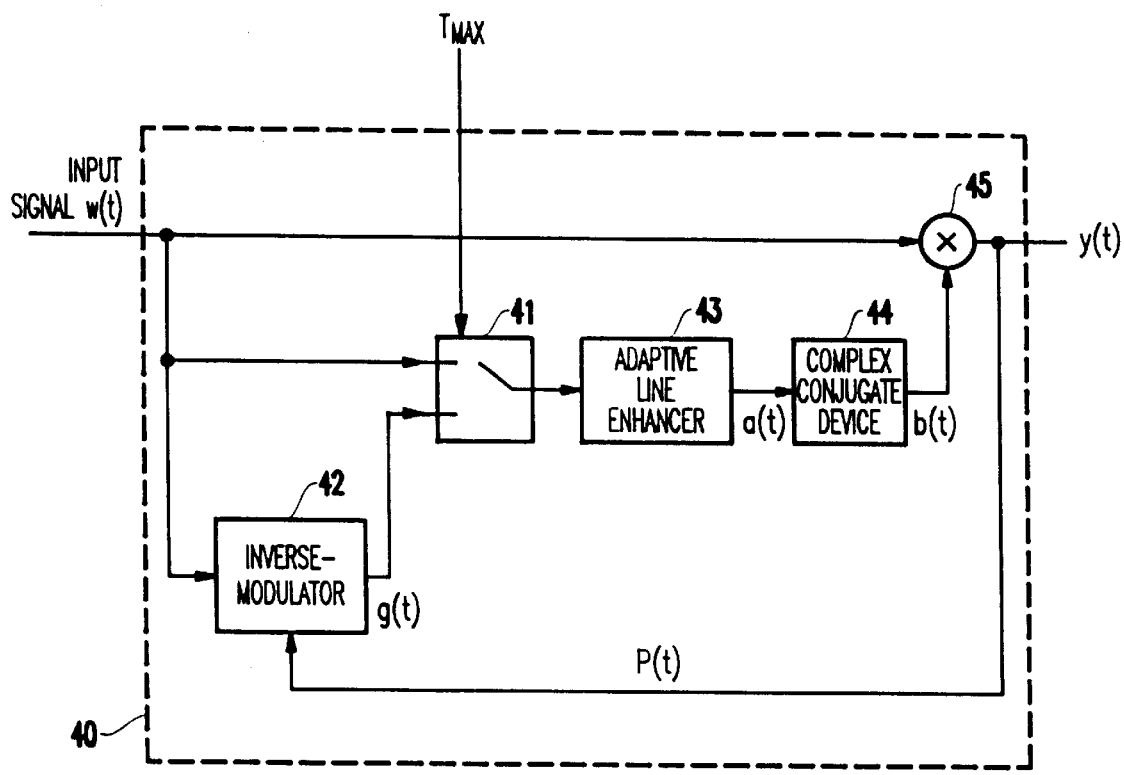
FIG. 3 is a schematic block diagram illustrating a carrier recovery circuit according to the present invention.

FIG. 3 illustrates the carrier recovery circuit 40 of FIG. 1, in greater detail. In the carrier recovery circuit, a switch 41 selects between the signal directly output from the inverse-modulator 14 and the same signal passed through inverse-converter 42 based on the TMAX signal output from the peak detector 8 (e.g., shown in FIG. 1). Thus, the selector 41 selects the unmodified input signal during the unique word portion (e.g., zone) of the signal, and selects the output of the inverse-modulator 42 during all portions of the signal except for the unique word portion (zone). The inverse-modulator 42 performs the same function as the inverse-modulator 14 of FIG. 1.

Selector 41 outputs the selected signal to an adaptive line enhancer 43. The enhancer 43 outputs the carrier component of the input signal. The enhancer 43 preferably is an adaptively-tuned filter (e.g., FIR), whose top coefficient is adapted such that the FIR becomes a bandpass filter (BPF) whose center frequency is equal to the line component (e.g., from the FFT) of the input signal. Thus, the adaptive line enhancer 43 is an adaptive filter which is tuned to a luminescent line component in the input signal and operates as a band pass filter (BPF) having a narrow band with the adapted frequency as a center frequency. In this way, the enhancer 43 outputs the luminescent component of the input signal.

The output of the enhancer 43 is converted into the conjugated value by a complex-conjugating device 44, and then multiplied by the unmodified input signal (e.g., the signal directly from inverse-modulator 14) by the multiplier 45, to thereby obtain a demodulated signal. Therefore, multiplier 45 inverse-modulates the input signal, and outputs signal y(t).

In FIG. 3, the switch 41 is set such that the input signal from the frequency error removing circuit 20 is inputted to the adaptive line enhancer 43 during the portion (zone) of the unique word. This signal is shown in the above equation (14). As mentioned above, the adaptive line enhancer 43 is an adaptive filter which is tuned to the line component in the input signal and operates as a band pass filter (BPF) having a narrow band with the adapted frequency as a center frequency. The enhancer outputs the line component of the input signal. Therefore, the signal a(t) enhances the carrier component of the input signal, and is shown in the following equation (16).

$$a(t)=e^{j2\pi\Delta ft} \qquad \text{Equation (16)}$$

The complex-conjugating device 44 outputs the following conjugated value b(t) of the a(t), as shown in the following equation (17).

$$b(t)=a^*(t)=e^{-j2\pi\Delta ft} \qquad \text{Equation (17)}$$

Value b(t) is multiplied by input signal w(t) by the multiplier 45. The output y(t) of multiplier 45 is the demodulated signal and is represented by the following equation (18).

$$y(t+t_b)=w(t+t_b)e^{-j2\pi\Delta ft}$$

$$=\begin{cases} 1 & (t_0 \le t \le t_0 + t_u) \\ P(t) & (t:\text{ except the above time; e.g., except} \\ & \text{ for unique word time}) \end{cases} \qquad \text{Equation (18)}$$

When the input w(t) from the frequency error removing circuit 20 is multiplied by the inverse-modulator 42 by using the demodulating signal P(t) (e.g., (P(t) does not include the unique word portion), the output g(t) is as shown in the following equation (19).

$$g(t)=w(t+t_b)P^*(t)=e^{j2\pi\Delta ft} \qquad \text{Equation (19)}$$

Equation 19 similarly obtains a signal in which the demodulated component is removed from the input signal, whereby this signal is inputted to the adaptive line enhancer 43 through the switch 41, which extracts the carrier signal, as discussed above.

The switching operation illustrated in FIG. 3 is similar to that in the conventional structure of FIG. 10. Specifically, in the present invention, the switching is performed based on the TMAX signal, which allows greater accuracy of clock timing. In the conventional system of FIG. 10, a level signal (e.g., measurement of threshold vs. measurement of peak) is simply used to select either an output of the fixed word table 32 or the output of the hard decision circuit 33 estimate $R_H$ (e.g., thus threshold level signal employed, not a peak signal).

With the unique and unobvious structure and method of the present invention, the accuracy of the clock phase in a demodulator is increased to within about ±½ to approximately ±⅛ of a clock cycle. In contrast, the conventional demodulating devices, which is illustrated in FIGS. 9 and 10, has an accuracy only within the range of ±½ of a clock cycle. Thus, the accuracy of the present invention is much greater than that of the conventional systems.

Second Embodiment

As mentioned above, the delay device 1 delays one symbol time. However, this present invention is not restricted to this delay time. In the second embodiment according to the present invention, a preamble-less demodulator having a delay device having another delay time is provided.

Figure 4:
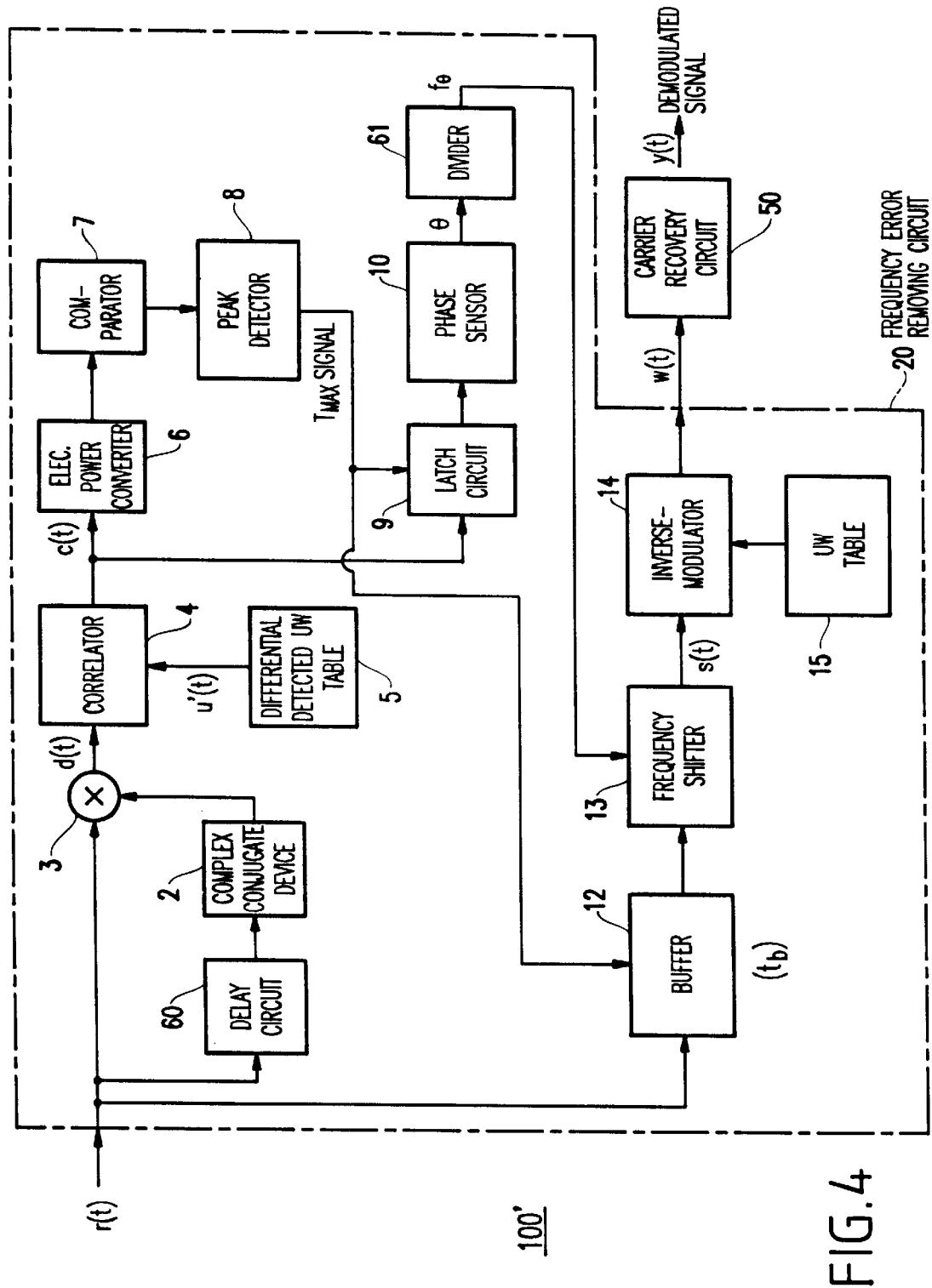
FIG. 4 is a schematic block diagram of a demodulating device according to a second embodiment of the present invention.

FIG. 4 is a schematic block diagram of a demodulating device 100' including a frequency error removing circuit 20 and a carrier recovery circuit 50 according to the second embodiment of the present invention. The frequency error removing circuit 20 is the same as in the configuration of FIG. 1 except for a delay circuit 60 and a divider 61.

The delay circuit 60 delays a time τ. The phase θ of the phase sensor 10 is divided by the 2 π τ value of the divider 61.

In equation 4, the correlated value c(t) is represented for a case of signal having no noise (e.g., a no-noise signal). However, in an actual received signal, the correlated value c(t) is affected by a noise signal.

When a received signal contains a noise signal θn, the correlated value c(t) is represented by the following equation (20).

$$c(t)=Ae^{-j(2\pi fd\tau+\theta n)} \qquad \text{Equation (20)}$$

Thus, the estimated frequency fe has the following estimating frequency.

$$fe = \theta/2\pi\tau = (2\pi fd\ \tau + \theta n)/2\pi\tau = fd + \theta n/2\pi\tau \quad \text{Equation (21)}$$

In equation 21, the frequency error of the estimating frequency error fe is $\theta n/2\pi\tau$ and is decreased by enlarging the delayed time $\tau$.

However, when the $\tau$ is too large, the $2\pi fd\ \tau$ is over the $\pi$. In this case, a correct frequency estimation is impossible.

That is, the $\tau$ has the following an upper limit in accordance with the frequency error fd.

$$2\pi fd\ \tau < \pi \quad \tau < \tfrac{1}{2}fd \quad \text{Equation (22)}$$

In FIG. 4, the delay time $\tau$ of the delay circuit 60 is selected to a suitably large value which satisfies a condition of equation 22.

As a result, since the frequency error of the estimating frequency fe is very small, the estimating frequency error fe is nearly equal to the fd as shown in the following equation.

$$fe \approx fd \quad \text{Equation (23)}$$

Therefore, when the received signal has a noise signal, the second embodiment of the present invention can estimate a correct frequency error fe.

Figure 5:
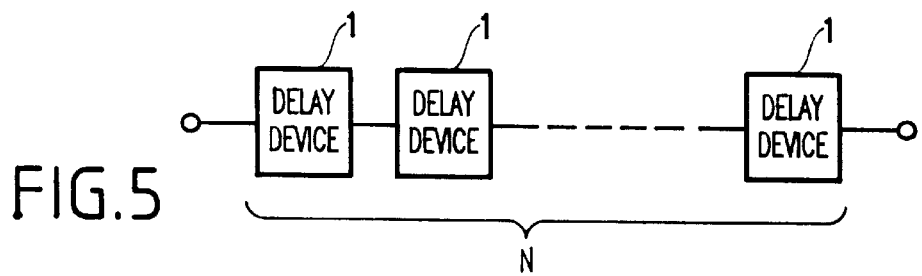
FIG. 5 is a schematic block diagram of a delay circuit 60 according to the second embodiment of the present invention.

FIG. 5 is a schematic block diagram of a delay circuit 60 according to the second embodiment of the present invention. As shown in FIG. 5, the delay circuit 60 includes a series circuit having a plurality of delay devices 1.

The number N of the delay devices is a suitably large number within a condition of equation 22. The devices 1 may have a different or the same delay time.

As the carrier recovery circuit 50, the carrier recovery circuit 40 of FIG. 1 can be used. The carrier recovery circuit 40 has a wide acquisition range, but it has a complicated configuration. The carrier recovery circuit 50 in FIG. 5 can use a carrier recovery circuit with more simple configuration, for example, a phase-locked-loop (PLL) type. Because the carrier recovery circuit 50 in FIG. 4 does not need a wide acquisition range, it can estimate correct frequency error by increasing a delay time. Thus, such a configuration provides increased accuracy, with a simpler configuration.

Figure 6:
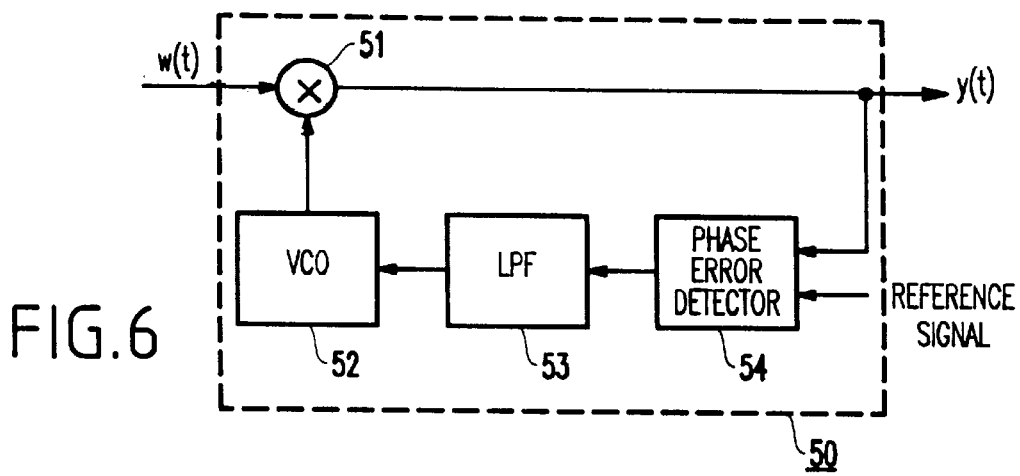
FIG. 6 is a schematic block diagram of a carrier recovery circuit 50 according to the second embodiment of the present invention.

FIG. 6 is a schematic block diagram of a carrier recovery circuit 50, which is, for example, a PLL-type demodulator. Input signal w(t) is multiplied with an output of Voltage-Controlled Oscillator (VCO) 52 by a multiplier 51, and an output of the multiplier 51 is a demodulated signal y(t).

A phase difference between the demodulated signal y(t) and a reference signal is detected by a phase error detector 54. The output signal of phase error detector 54 is filtered by a loop filter 53 and control a phase of the VCO 52.

Thus, with the present invention, the subsequent acquisition characteristic of the demodulator does not deteriorate.

Further, the present invention achieves a considerably high acquisition frequency range (e.g., possibility over 95% which is increased greatly (from about $\pm\tfrac{1}{8}$ to $\pm\tfrac{1}{2}$ of the symbol frequency) when compared with the conventional demodulating device.

Figure 7:
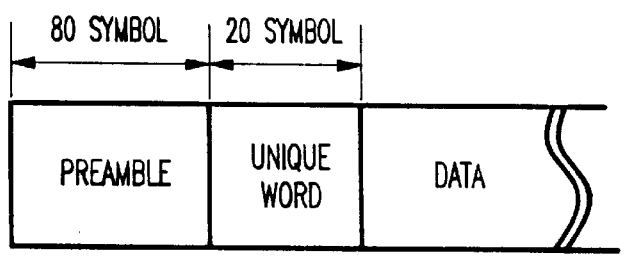
FIG. 7 illustrates the structure of a frame according to the conventional system.
Figure 8:
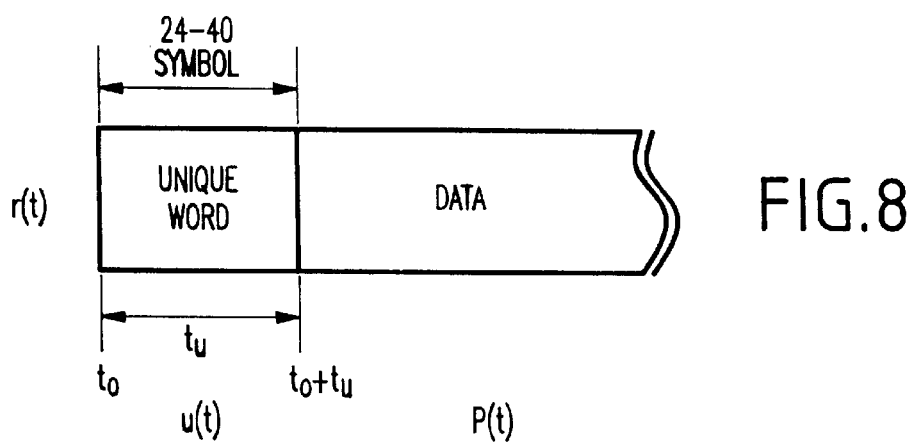
FIG. 8 illustrates the structure of a frame according to the first and second embodiments of the present invention.

As a result, with the present invention the preamble-less demodulating device has increased channel or traffic efficiency. Further, a format efficiency is increased since a greater area is provided for data since a preamble is not required by the present invention. FIG. 7 illustrates the structure of a frame according to the conventional system, whereas FIG. 8 illustrates the structure of a frame according to the first and second embodiments of the present invention. As shown in a comparison of FIG. 7 with FIG. 8, with the present invention, greater efficiency is provided in terms of symbol frequency and area available for data. It is noted that the symbol rates illustrated are merely exemplary.

Moreover, the invention possesses a sufficiently high speed and wide frequency range characteristic (and length of the unique word is sufficiently expanded) since the preamble is unnecessary. This is true even though it is usual that the preamble is disposed on a leading end of the signal in the conventional satellite communication.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A preamble-less demodulator, comprising:
   a detector for detecting a differential-detected unique word portion of an input signal, said input signal comprising said unique word portion and a data portion and being devoid of a preamble;
   a correlator for cross-correlating an output of said differential-detector and data in a data table obtained by said differential-detected unique word portion;
   a latch for latching a signal when an electrical power of a correlation output which exceeds a threshold value becomes a local maximum;
   a frequency error estimator for determining a frequency error of said unique word portion based on said latched signal; and
   means for demodulating said data portion based on said differential-detected unique word portion and said frequency error.

2. The preamble-less demodulator as in claim 1, wherein said detector comprises a delay unit for delaying said input signal.

3. The preamble-less demodulator as in claim 1, wherein said detector comprises a delay circuit for delaying said input signal for a long time within a time of ½fd, wherein fd is a frequency error of said unique word portion.

4. The preamble-less demodulator as in claim 3, wherein said a delay circuit having a plurality of serially-arranged delay units.

5. The preamble-less demodulator as in claim 3, wherein said demodulating means comprises:
   a voltage controlled oscillator (VCO) for generating a signal on the basis of a control signal;
   a multiplier for multiplying said data portion of said input signal with an output signal of said VCO, and for outputting a demodulated signal;
   a phase error detector for detecting a phase difference between said demodulated signal and a reference, and for outputting said control signal.

6. A preamble-less demodulator, comprising:
   a detector for detecting a differential-detected unique word portion of an input signal, said input signal comprising said unique word portion and a data portion and being devoid of a preamble;
   a frequency error estimator for determining a frequency error of said unique word portion; and
   means for demodulating said data portion based on said differential-detected unique word portion and said frequency error,
   wherein said detector comprises:

a differential detector for differential-detecting said unique word with respect to a predetermined time;

a unique word table for storing unique words;

a correlator for cross-correlating an output of said differential detector and an output of said unique word table storing a predetermined unique word;

a power converter for converting an output of said correlator to a power signal;

a comparator for judging when said power signal exceeds a predetermined threshold; and a latch for latching said input signal when said power signal exceeds said threshold, thereby latching said unique word portion.

7. The preamble-less demodulator as in claim 6, wherein said unique word table comprises a table of said unique word portion having been differential-detected.

8. A preamble-less demodulator, comprising:

a detector for detecting a differential-detected unique word portion of an input signal, said input signal comprising said unique word portion and a data portion and being devoid of a preamble;

a frequency error estimator for determining a frequency error of said unique word portion; and means for demodulating said data portion based on said differential-detected unique word portion and said frequency error, wherein said frequency error estimator comprises:
   a phase detector for detecting a phase of said differential-detected unique word portion; and
   a divider for dividing said phase, thereby producing a frequency error signal.

9. The preamble-less demodulator as in claim 8, further comprising a delay unit for delaying said input signal, wherein said divider divides said phase by $2\pi tc$, wherein tc is a delay time of one time slot delayed by said delay unit.

10. A preamble-less demodulator, comprising:

a detector for detecting a differential-detected unique word portion of an input signal, said input signal comprising said unique word portion and a data portion and being devoid of a preamble;

a frequency error estimator for determining a frequency error of said unique word portion; and means for demodulating said data portion based on said differential-detected unique word portion and said frequency error, wherein said demodulating means comprises:
   a first inverse-modulator for inverse-modulating said data portion of said input signal;
   a switch for switching a connection between said inverse-modulator or a second inverse-modulator;
   a complex-conjugating circuit for complex-conjugating an output of said switch; and
   a multiplier for multiplying an output of said complex-conjugating circuit, and for outputting a demodulated signal.

11. A device for demodulating a signal, said signal having a unique word portion and a data portion without a preamble portion, comprising:

a differential-detecting circuit for differential-detecting said input signal by a time-delay;

means for differential-detecting said unique word portion and forming a differential-detected unique word table;

a correlator for correlating an output of said differential-detecting circuit and a pattern obtained from said differential-detected unique word table;

a power converter for converting an output of said correlator to a power signal;

a peak detector for detecting a time at which said power signal reaches a maximum;

a frequency error estimator for obtaining a phase of an output value of said correlator when said power signal reaches said maximum;

a frequency shifter for shifting a frequency of said input signal according to an output of said frequency error estimator and outputting an output signal having a unique word portion and an output data portion;

means for detecting said unique word portion and forming a unique word table;

a first inverse-modulator for inverse-modulating said unique word portion based on said unique word table, and a carrier recovery circuit for recovering a carrier signal of an output of said inverse-modulator and outputting a demodulated signal.

12. The demodulating device as in claim 11, further comprising:

a buffer for storing said input signal and for outputting said input signal from a leading portion of said unique word based on when said peak detector detects said maximum, said buffer providing an output to said frequency shifter.

13. The demodulating device as in claim 11, further comprising:

a divider for dividing said phase by said delay time of said differential-detecting circuit, wherein said carrier recovery circuit comprises:
   a second inverse-modulator connected to said frequency shifter for inverse-modulating said output data portion;
   a switch for selecting between an output of said first inverse-modulator and an output of said second inverse-modulator;
   an adaptive line enhancer for sampling an output of said switch;
   a complex-conjugating device for transforming an output of said adaptive line enhancer to a complex conjugate; and
   a multiplier for multiplying an output of said complex-conjugating device by said output of said first inverse-modulator, and for outputting said demodulated signal.

14. The demodulating device as claimed in claim 11, wherein said means for differential-detecting includes a delay unit for delaying said input signal.

15. The demodulating device as claimed in claim 11, wherein said means for differential-detecting includes a delay circuit for delaying said input signal for a long time within a time of ½fd, wherein fd is a frequency error of said unique word portion.

16. The preamble-less demodulator as in claim 15, wherein said delay circuit having a plurality of serially-arranged delay units.

17. The preamble-less demodulator as in claim 15, wherein said demodulating means comprises:

a voltage controlled oscillator (VCO) control signal;

a multiplier for multiplying said data portion of said input signal with an output signal of said VCO, and for outputting a demodulated signal; and a phase error detector for detecting a phase difference between said demodulated signal and a reference signal, and for outputting said control signal.

18. A method of demodulating an input signal, having a unique word section and a data section without a preamble portion, said method comprising differential-detecting said input signal to form a differential-detected signal;

correlating an output of said differential-detected signal and a data table, said data table being obtained by differential-detecting a unique word;

detecting a time when a power of said correlating step exceeds a threshold value, said power comprising a local maximum;

storing said input signal in a buffer;

reading said input signal from said buffer beginning at a first end of said unique word;

estimating a frequency error of said input signal based on a phase of said correlating step;

obtaining a signal by removing said frequency error from said input signal;

inverse-modulating said unique word portion of said signal in which said frequency error is removed, according to a unique word table; and recovering a carrier signal based on said input signal.

19. The method according to claim 18, wherein said differential-detecting includes delaying said input signal by a delay unit.

20. The method according to claim 18, wherein said differential-detecting includes delaying said input signal for a long time within a time of ½ fd, wherein fd is a frequency error of said unique word portion.

21. The method according to claim 20, wherein said delaying said input includes delaying said input signal by a plurality of delay units.

22. The method according to claim 20, wherein said recovering a carrier includes recovering said carrier signal by a PLL (Phase Locked Loop)-type demodulator.

23. A method of demodulating a signal, said signal including a data portion and a unique word portion without a preamble portion, said method comprising:

inputting said signal;

converting said signal to a power signal;

determining when said power signal exceeds a threshold;

latching said signal when said power signal exceeds said threshold;

detecting said unique word portion of said signal;

determining a frequency error of said unique word portion;

referring to a unique word table, based on said unique word portion; and demodulating said data portion based on said unique word portion and said frequency error.

24. The method according to claim 23, wherein said detecting includes delaying said input signal by a delay unit.

25. The method according to claim 23, wherein said detecting includes delaying said input signal for a long time within a time of ½ fd, wherein fd is a frequency error of said unique word portion.

26. The method according to claim 25, wherein said delaying said input signal includes delaying said input signal by a plurality of delay units.

27. The method according to claim 26, wherein said demodulating comprises:

generating, by a voltage controlled oscillator (VCO), a signal on the basis of a control signal;

multiplying, by a multiplier, said data portion of said input signal with an output signal of said VCO, and outputting a demodulated signal; and detecting, by a phase error detector, a phase difference between said demodulated signal and a reference signal, and outputting said control signal.

28. A method of demodulating a signal, said signal including a data portion and a unique word portion without a preamble portion, said method comprising:

inputting said signal;

detecting said unique word portion of said signal;

determining a frequency error of said unique word portion;

referring to a unique word table, based on said unique word portion; and demodulating said data portion based on said unique word portion and said frequency error, wherein said detecting comprises:
converting said signal to a power signal;
determining when said power signal exceeds a threshold; and
latching said signal when said power signal exceeds said threshold, thereby latching said unique word portion.

29. A method of demodulating a signal, said signal including a data portion and a unique word portion without a preamble portion, said method comprising:

inputting said signal;

detecting said unique word portion of said signal;

determining a frequency error of said unique word portion;

referring to a unique word table, based on said unique word portion; and demodulating said data portion based on said unique word portion and said frequency error, wherein said determining comprises:
detecting a phase of said unique word portion; and
dividing said phase, thereby producing said frequency error.

30. The method as in claim 29, wherein said dividing includes dividing said phase by $2\pi tc$ and wherein said detecting comprises delaying said input signal, wherein tc is a delay time of one time slot delayed by a delay unit.

31. A method of demodulating a signal, said signal including a data portion and a unique word portion without a preamble portion, said method comprising:

inputting said signal;

detecting said unique word portion of said signal;

determining a frequency error of said unique word portion;

referring to a unique word table, based on said unique word portion; and demodulating said data portion based on said unique word portion and said frequency error, wherein said demodulating comprises:
inverse-modulating said data portion of said input signal;
switching a connection between one of an output of said inverse-modulation and an output of said referring; and
complex-conjugating an output of said switching.

32. The method as in claim 31, wherein the demodulating further comprises:

multiplying an output of said complex-conjugating; and inverse-modulating an output of said referring based on an output of said multiplying, and outputting a demodulated signal.

* * * * *